United States Patent [19]
Han

[11] Patent Number: 6,027,772
[45] Date of Patent: Feb. 22, 2000

[54] OPTICAL ALIGNMENT COMPOSITION, ALIGNMENT LAYER FORMED USING THE SAME AND LCD HAVING THE ALIGNMENT LAYER

[75] Inventor: Kwan-young Han, Suwon, Rep. of Korea

[73] Assignee: Samsung Display Devices Co., Ltd., Kyungki-do, Rep. of Korea

[21] Appl. No.: 08/998,944

[22] Filed: Dec. 29, 1997

[30] Foreign Application Priority Data

Dec. 30, 1996 [KR] Rep. of Korea .................. 96-76973

[51] Int. Cl.[7] .................................................. G02F 1/1337
[52] U.S. Cl. .................................................. 428/1; 525/180
[58] Field of Search .................. 428/1; 525/180; 349/123

[56] References Cited

U.S. PATENT DOCUMENTS 5,670,084  9/1997  Harada et al. ........................ 428/1

*Primary Examiner*—Alexander Thomas
*Attorney, Agent, or Firm*—Lowe Hauptman Gopstein Gilman & Berner

[57] ABSTRACT

An optical alignment composition, an alignment layer formed using the same with an excellent liquid crystal alignment property, and an LCD having the alignment layer are provided. The optical alignment composition having excellent thermal stability and alignment property and an alignment layer can be obtained while adopting a non-destructive optical alignment method. Accordingly, an LCD with improved performance can be obtained.

5 Claims, 1 Drawing Sheet

OPTICAL ALIGNMENT COMPOSITION, ALIGNMENT LAYER FORMED USING THE SAME AND LCD HAVING THE ALIGNMENT LAYER

BACKGROUND OF THE INVENTION

1. Field of the Invention

The present invention relates to a liquid crystal display device (LCD), and more particularly, to an optical alignment composition, an alignment layer, and an LCD having the alignment layer formed using the optical alignment composition.

2. Description of the Related Art

In general, a liquid crystal molecule has the characteristics of an intermediate state between a liquid and a solid, having the fluidity of a liquid and having the optical property of a solid, and can be changed in its optical anisotropy by an electric field or heat. A liquid crystal display device (LCD) utilizes such properties and is typically used as a flat-panel display device.

FIG. 1 is a schematic section view of a general LCD, in which transparent electrodes 3 and 3' made of indium tin oxide (ITO) are formed on a pair of upper and lower substrates 2 and 2' made of glass. Insulating layers 4 and 4' and alignment layers 5 and 5' for aligning liquid crystals are sequentially formed on the transparent electrodes 3 and 3'. A spacer 6 is sustained between the alignment layers 5 and 5' with a cell gap. A liquid crystal material is injected into the cell gap to form a liquid crystal layer 7. Polarizing plates 1 and 1' for polarizing entering and transmitted lights are provided at the exterior of the substrates 2 and 2'.

FIG. 2 shows the positional relationship between liquid crystal molecules and an alignment surface (substrate), in which a pretilt angle means an angle formed by the substrate surface and a liquid crystal director. An alignment layer must be formed by employing an appropriate alignment material or using an appropriate alignment method so that the pretilt angle of the liquid crystal can be adjusted within a proper range, which is essential for improving the display characteristic of the LCD.

For the purpose of forming an alignment layer, a rubbing treatment has been generally used, that is, a polymer resin film such as a polyimide film is formed on a substrate where an electrode is formed and then the film is rubbed with a piece of cloth. However, according to this method, dust or static electricity may be generated due to mechanical contact between the rubbing cloth and the alignment layer.

Thus, an optical alignment technology has recently been developed, which is non-destructive unlike the rubbing treatment. According to the optical alignment technology, polarized light is irradiated into a photopolymeric alignment layer and anisotropic photopolymerization occurs so that liquid crystal molecules are uniformly aligned.

As the material of a photopolymeric alignment layer, a polycinnamate such as PVCN (polyvinylcinnamate) or PVMC (polyvinyl methoxycinnamate) has been used. However, such polymers have poor thermal stability and it is difficult to control the pretilt angle of liquid crystals. Further, the pretilt angle is no more than 0°. Thus, it is difficult to apply such polymers to the LCD. Although much research into methods for increasing the pretilt angle has been conducted, the result of the research has not been satisfactory.

SUMMARY OF THE INVENTION

To solve the above problem(s), it is an object of the present invention to provide an optical alignment composition having excellent thermal stability and capable of controlling a pretilt angle.

It is another object of the present invention to provide a liquid crystal display (LCD) having excellent thermal stability.

Accordingly, to achieve the first object, there is provided an optical alignment composition including a vinylcinnamate derivative polymer and polyimide in a weight ratio of 98:2 to 2:98.

The second object of the present invention is achieved by an LCD having upper and lower substrates, transparent electrodes each formed on the upper and lower substrates, alignment layers each formed on the transparent electrodes, and liquid crystal layer interposed between the alignment layers.

Preferably, the vinylcinnamate derivative polymer is selected from poly(vinylcinnamate) and poly(vinylmethoxy cinnamate), and the weight-average molecular weight thereof is preferably 5,000~30,000.

It is preferable that the polyimide is a side chain type and the weight-average molecular weight thereof is 5,000~20,000. Also, it is preferable that the polyimide is a straight chain type and the weight-average molecular weight thereof is 5,000~30,000.

The solvent used for the optical alignment composition according to the present invention is not specifically restricted.

BRIEF DESCRIPTION OF THE DRAWING(S)

The above object(s) and advantage(s) of the present invention will become more apparent by describing in detail a preferred embodiment thereof with reference to the attached drawing in which.

DESCRIPTION OF THE PREFERRED EMBODIMENT(S)

Figure 1:
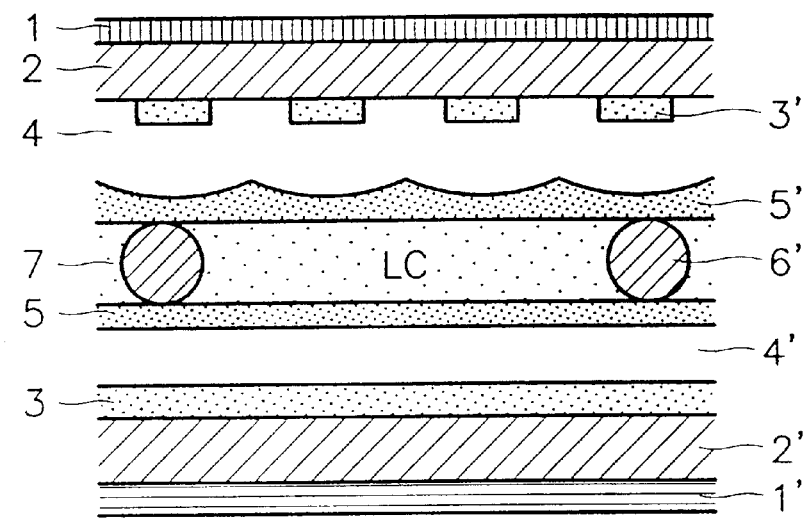
FIG. 1 is a section view of a general liquid crystal display.
Figure 2:
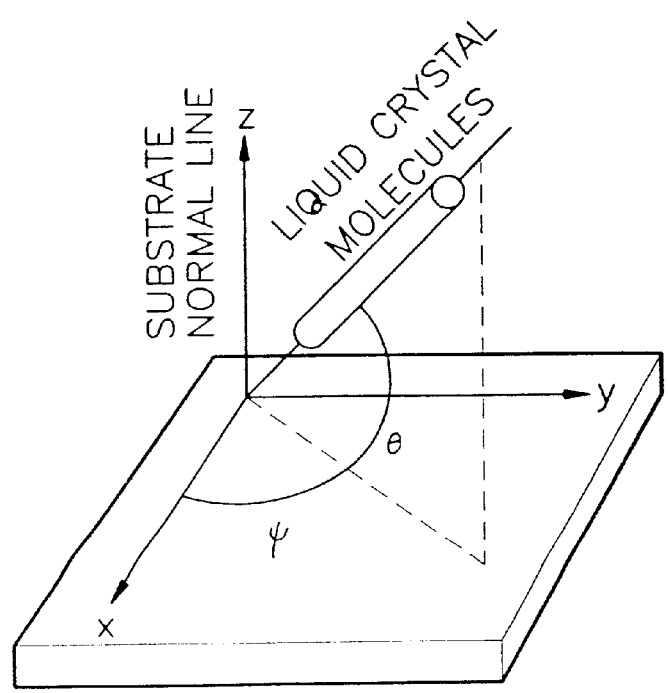
FIG. 2 shows the positional relationship between liquid crystal molecules and an alignment surface (substrate).

In the present invention, an optical alignment composition having a vinylcinnamate derivative polymer and polyimide, an alignment layer formed using the same, and an LCD having the alignment layer are provided. As the vinylcinnamate derivative polymer, a material selected from poly(vinylcinnamate) and poly(vinylmethoxycinnamate) is used and the polymer preferably has a weight-average molecular weight of 5,000~30,000. As the polyimide, preferably, a side chain type of polyimide having a weight-average molecular weight of 5,000~20,000, or a straight chain type of polyimide having a weight-average molecular weight of 5,000~30,000 can be used. At this time, it is preferable that the weight ratio of the vinylcinnamate derivative polymer to polyimide is 2:98 to 98:2. In other words, when the two polymers are mixed in this mixture ratio, the vinylcinnamate derivative polymer serves to cause optical alignment, the polyimide is helpful in improving thermal stability and generates the pretilt angle of liquid crystals. Therefore, the LCD having the alignment layer formed using the optical alignment composition has excellent electrooptical characteristics.

Hereinbelow, the present invention will be described in more detail through the following non-limited embodiments.

EXAMPLE 1

2 g of poly(vinylcinnamate) and 98 g of polyimide (RN715 mfg. by Nissan Chemical Industries, Ltd., Japan)

were dissolved in 500 g of NMP, thereby manufacturing an optical alignment composition. The composition was coated on upper and lower transparent substrates where ITO electrodes are formed using a spin coater, soft-baked at about 100° C. for about 30 minutes, and then ultraviolet ray (350 nm, 100 mW/cm$^2$) was irradiated. Subsequently, hard-baking was conducted so that the solvent was evaporated and removed. Then, a cell gap was formed using a spacer by a conventional method of manufacturing an LCD, and liquid crystals were injected into the cell gap, thereby completing the LCD.

EXAMPLE 2

With the exception of 30 g of poly(vinylcinnamate) and 70 g of polyimide being used, an LCD was fabricated in the same manner as described in Example 1.

EXAMPLE 3

With the exception of 40 g of poly(vinylcinnamate) and 60 g of polyimide being used, an LCD was fabricated in the same manner as described in Example 1.

EXAMPLE 4

With the exception of 50 g of poly(vinylcinnamate) and 50 g of polyimide being used, an LCD was fabricated in the same manner as described in Example 1.

EXAMPLE 5

With the exception of 70 g of poly(vinylcinnamate) and 30 g of polyimide being used, an LCD was fabricated in the same manner as described in Example 1.

EXAMPLE 6

With the exception of 98 g of poly(vinylcinnamate) and 2 g of polyimide being used, an LCD was fabricated in the same manner as described in Example 1.

EXAMPLES 7–12

With the exception of poly(vinylcinnamate) being used instead of poly(vinylcinnamate), an LCD was fabricated in the same manner as described in Examples 1–6.

EXAMPLES 13–24

With the exception of straight chain type RN722L manufactured by Nissan Chemical Industries, Ltd. being used instead of side chain type RN715 manufactured by the same company, an LCD was fabricated in the same manner as described in Examples 1–12.

COMPARATIVE EXAMPLES 1–5

With the exception of 1 g of poly(vinylcinnamate) and 99 g of straight chain type polyimide (Comparative example 1), 1 g of poly(vinylcinnamate) and 99 g of side chain type polyimide (Comparative example 2), 99 g of poly(vinylcinnamate) and 1 g of the straight chain type polyimide (Comparative example 3), 99 g of poly(vinylcinnamate) and 1 g of the side chain type of polyimide (Comparative example 4), and 100 g of poly(vinylcinnamate) without polyimide (Comparative example 5), being used, respectively, an LCD was fabricated in the same manner as described in Example 1.

Then, the pretilt angle and alignment degree were measured with respect to the LCDs manufactured according to the above-described examples and comparative examples. At this time, the measurement of the pretilt angle and alignment degree was conducted by a standard method. As a result, in the case of Comparative Example 5, the pretilt angle was nearly 0°. Also, in the cases of Comparative Examples 3 and 4, the pretilt angle was almost 0°. In Comparative Examples 1 and 2, the pretilt angle was higher but the optical alignment property was not very good. On the other hand, in the case of Examples, the more polyimide that was added, the larger the pretilt angle became. In these cases, there was no problem with the optical alignment property. Also, the thermal stability was greatly improved, so that it is possible to increase the baking temperature to 140° C. during forming the alignment layer.

As described above, according to the present invention, an optical alignment composition capable of controlling the pretilt angle and having excellent thermal stability and an alignment layer can be obtained while adopting a non-destructive optical alignment method. Accordingly, an LCD with improved performance can be obtained.

What is claimed is:

1. A liquid crystal display device (LCD) having upper and lower substrates, transparent electrodes each formed on the upper and lower substrates, respectively, alignment layers each formed on the transparent electrodes, respectively, and liquid crystals injected between the alignment layers, wherein the alignment layers each include a vinyl cinnamate derivative homopolymer and a polyimide in a weight ratio of 98:2 to 2:98.

2. The LCD of claim 1, wherein the vinylcinnamate derivative polymer is selected from poly(vinylcinnamate) and poly(vinylmethoxy cinnamate).

3. The LCD of claim 1, wherein the vinylcinnamate derivative polymer has a weight-average molecular weight of 5,000~30,000.

4. The LCD of claim 1, wherein the polyimide is a side chain type and the weight-average molecular weight thereof is 5,000~20,000.

5. The LCD of claim 4, wherein the polyimide is a straight chain type and the weight-average molecular weight thereof is 5,000~30,000.

* * * * *